May 21, 1935.                J. F. SCANLON                2,001,979
                           ADVERTISING DEVICE
                          Filed April 6, 1933
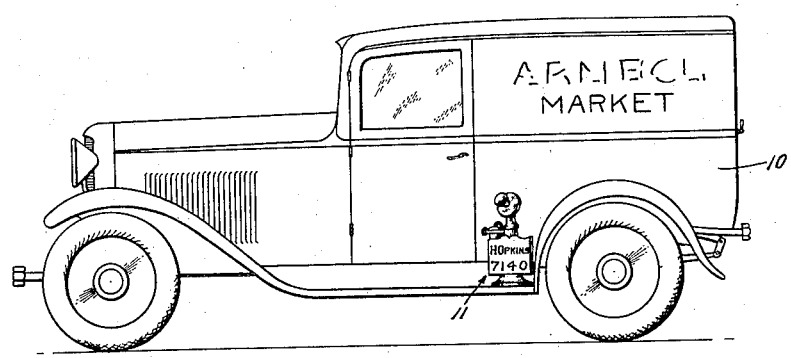
Fig. 1
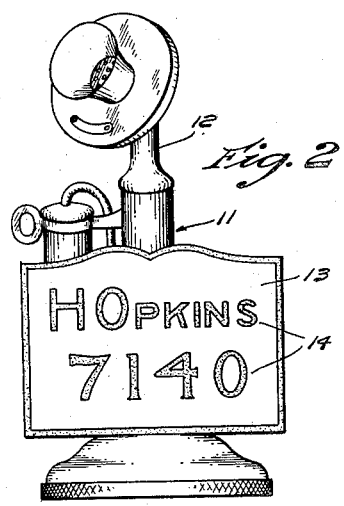
Fig. 2
Fig. 3
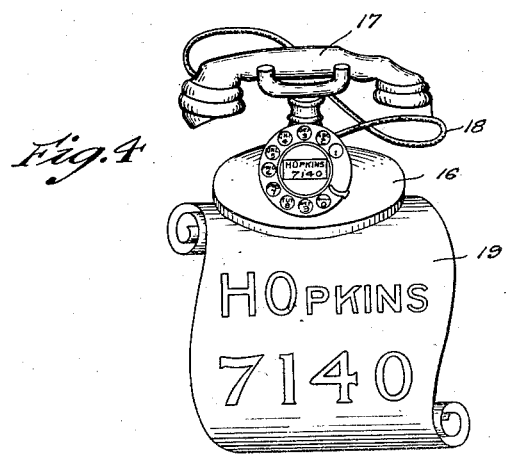
Fig. 4
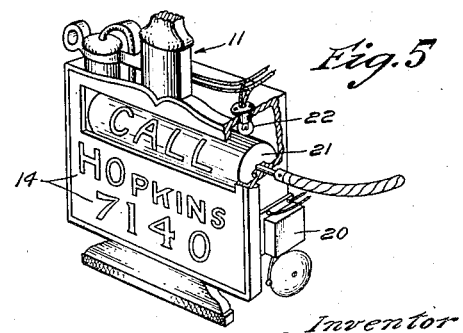
Fig. 5
Inventor
John F. Scanlon
By Nathaniel Frucht
his Attorney Patented May 21, 1935

2,001,979

UNITED STATES PATENT OFFICE 2,001,979

ADVERTISING DEVICE

John Francis Scanlon, Edgewood, R. I.

Application April 6, 1933, Serial No. 664,697

1 Claim. (Cl. 40—126)

My present invention relates to advertising devices, and has particular reference to advertising devices used in conjunction with moving vehicles.

It has been found desirable to connect an advertising device with a moving vehicle or the like, with the purpose that an observer of the moving vehicle will be pictorially influenced to follow a course of action which is directed towards the business associated with the moving vehicle.

To this end, I have devised an advertising device which for example bears a simulation of a telephone, and have included a telephone number with said simulation, the device being mounted on a moving vehicle such as a delivery automobile, whereby an observer notes the business associated with the automobile, receives a pictorial impulse to telephone, and has his attention directed to the suitable telephone number.

While the novel advertising device has been found very effective in practice, I have also, in order to increase the effectiveness of the device, utilized arrangements for periodically actuating a telephone bell, and/or for utilizing a moving element, together with a lighting effect, if desired.

With the above and other objects and advantageous features in view, my invention consists of a novel arrangement of parts more fully disclosed in the detailed description following, in conjunction with the accompanying drawing, and more specifically defined in the claim appended thereto.

In the drawing,

Fig. 1 is an elevation of a moving vehicle equipped with the advertising device, Fig. 2 is a front elevation of the device, Fig. 3 is a side elevation thereof, Fig. 4 is a front elevation of a modification, and Fig. 5 is a perspective view of another modification, parts being broken away.

Referring to the drawing, an automobile delivery cart or the like 10 has the usual business notations thereon, and is equipped with an advertising device 11, which device includes a pictorial representation 12, in the present instance a telephone, and a direction section 13 which contains identifying indicia 14. The device may be made of any suitable material, such as metal, wood, paper, or the like, and is preferably provided with a support 15 for attaching the device to the automobile.

If desired, the pictorial representation may exactly simulate a particular article, as in the modification of Fig. 4, wherein the telephone representation 16 may have a removable receiver 17 secured to the telephone by a cord 18, the direction section 19 being in the form of a scroll.

In certain installations, it may be advisable to add arrangements for additionally attracting attention. Thus, as shown in Fig. 5, a bell 20 may be actuated either intermittently or continuously, by well known means, and an arrangement 21 for periodic changing of one or more indicia, as by continuous or intermittent rotation, by either mechanical or electrical mechanism of known type, may be utilized. Lighting effects may also be included, as by means of an electric lighting structure 22, which may be continuously or intermittently controlled in well-known fashion.

While I have described specific embodiments of my invention, it is obvious that desired changes in the material of the parts, in the pictorial representations and the indicia, and in the relative proportions of the parts, may be made to suit the requirements of different business concerns.

Thus, the indicia may be made replaceable, in order to permit periodic changing; the direction section may have swinging plates or the like instead of a rotating cylinder; the pictorial representation may be outlined or profiled instead of substantially complete; and other changes that appear desirable. Moreover, different lighting effects may be utilized, such as flood lighting, neon lighting, and the like. Thus, a very effective arrangement includes the use of mirrors, which are positioned on the moving vehicle so as to reflect the light from the front or rear lights on to the advertising device.

The advertising device may also be utilized as a stationary device, in certain arrangements, and particularly in window arrangements where the stationary device corresponds to the devices installed on the vehicles owned by the business. These different changes may therefore be made, without departing from the spirit and the scope of the invention as defined in the appended claim.

I claim:—

In combination, a vehicle having a body containing ownership indicia, and an advertising device mounted on said vehicle in spaced relation to the body and in visual juxtaposition to said ownership indicia, said advertising device illustrating a telephone and carrying a telephone indicia which corresponds to the ownership indicia.

JOHN FRANCIS SCANLON.